May 3, 1960  G. L. THOMPSON  2,935,039
MEANS FOR CONTROLLING THE EXHAUST GASES FROM MARINE ENGINES
Filed Nov. 7, 1957
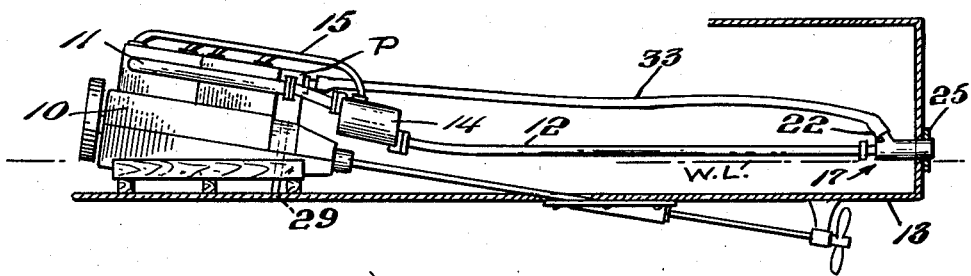
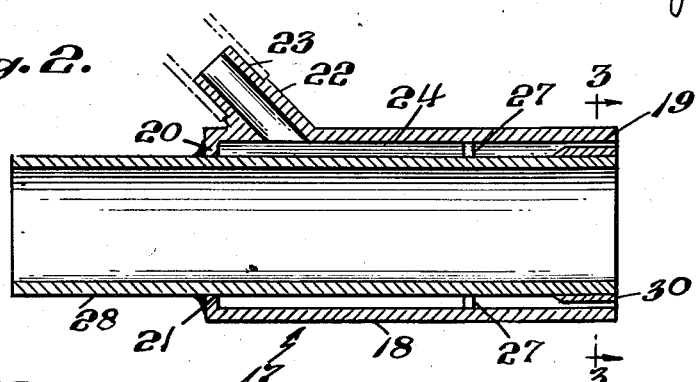
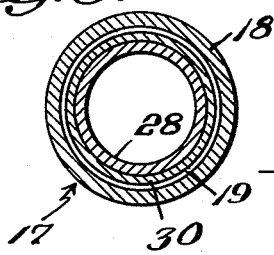
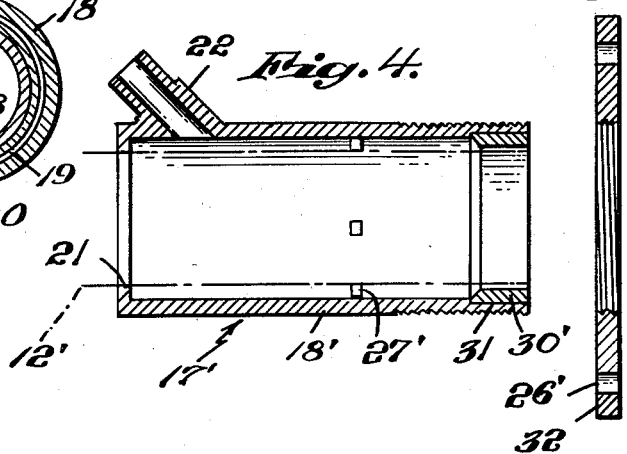
INVENTOR.
George L. Thompson
BY
Barlow & Barlow
ATTORNEYS.

United States Patent Office 2,935,039
Patented May 3, 1960

2,935,039

MEANS FOR CONTROLLING THE EXHAUST GASES FROM MARINE ENGINES

George L. Thompson, Narragansett, R.I., assignor of one-fourth to Robert Brown, Providence, R.I.

Application November 7, 1957, Serial No. 695,124

3 Claims. (Cl. 115—.5)

This invention relates to a device for controlling the discharge of the exhaust gases of an internal combustion engine, particularly a marine engine.

The exhaust fumes of boat engines, when discharged above the water can easily be obnoxious and this is particularly so when the boat is traveling with the wind. In some instances to obviate this difficulty, the exhaust gases are discharged below the surface of the water and are absorbed by the water. The discharge of exhaust gases below the surface of the water, however, produces a back-pressure in the exhaust line which reduces the efficiency of a combustion engine. Even if used, valves in the exhaust lines are necessary to block water from being drawn into the cylinder or cylinders of the engine during suction or partial vacuum produced in the exhaust manifold a condition that is aggravated with a following sea condition.

An object of this invention is to envelop the the exhaust gases with a shield of water as they are expelled above the water line of the boat.

A more specific object of the invention is to provide a device for discharging a flow of water in a substantially cylindrical form about the exhaust gases as expelled from the exhaust conduit.

Another object of the invention is to expel the exhaust gases centrally in a flow of water.

Another object of this invention is to provide a device of the above character which will be relatively inexpensive to manufacture and durable in use.

With these and other objects in view, the invention consists of certain novel features of construction as will be more fully described and particularly pointed out in the appended claims.

In the accompanying drawings:

Figure 1 is a partial longitudinal sectional view of a boat hull showing a conventional marine engine installation with a thru-hull exhaust fitting therefor embodying the invention.

Figure 2 is a longitudinal sectional view, on an enlarged scale of the discharge end portion of the exhaust line shown in Figure 1;

Figure 3 is a sectional view taken substantially along line 3—3 of Figure 2;

Figure 4 is a view similar to Figure 2 showing a modified construction; and

Figure 5 is a sectional view of a flange nut for use with the embodiment of Figure 4.

Referring to the drawing in more detail, particularly Figure 1 there will be seen a marine engine 10, which may be any conventional type, having an exhaust manifold 11 from which extends an exhaust pipe or conduit 12 to a thru-hull fitting 17 mounted in hull 13 to expel or discharge the exhaust gases above the water line, W.L. The exhaust system of the engine may or may not include a silencer. However, in the present instance a silencer 14 of any approved manufacture has been shown and this is interposed in the exhaust pipe 12 at a position adjacent to the engine 10 which is shown as being water cooled and provided with a raw water conduit 15 through which the water that has passed through the engine may be led. It may be here mentioned that the raw water coolant for the engine is supplied under pressure to the engine, usually by a pump, and in sufficient amounts to provide the required flow for cooling the engine and the exhaust gases. The silencer 14 is of the type in which water is discharged into the exhaust gases and to this end the water line 15 is connected to said silencer, line 15 being of a size to supply the required volume of water thereto.

According to the present invention I provided a device designated generally 17, see Figures 2 and 3 which comprises a tubular member or casing 18 which is open at one end as at 19 and closed at the other end by an end wall 20, having a central opening 21 therethrough. An inlet 22 which may have a reduced end portion 23 provides a conduit to the bore 24 of casing 18. The body of the device is generally circular in cross section and is adapted to be extended through a suitable opening through the hull 13 to project therefrom above the water line W.L. of the boat and is firmly attached to the hull in sealed tight relation by means of a flange 25 and caulking material in a known fashion. An inner tube 28 extends through opening 20 in seal-tight engagement therewith and terminates flush with the outer end of casing 18 as seen in Figure 2. It will be seen that the casing 18 surrounds the exhaust end portion of tube 28 in spaced relation therewith which spacing is maintained by projections 27 and a joint is formed as by welding at opening 20. Alternately, the parts 18 and 28 may be integral, as by casting in one piece. Thus, a tubular passageway is formed between the tube 28 and the wall of member 17. A fluid under pressure introduced through inlet 22 will flow through said passageway and be discharged at the open end in a stream substantially tubular and cylindrical in form about the discharge end of the tube 28. This stream or flow will envelop the exhaust gases as expelled from tube 12 to absorb and lay the same on the surface of the water to be left behind the traveling boat.

The fluid utilized is sea water which may be supplied through a sea-cock, such as at 29, and placed under pressure by a pump P for discharge into conduit 33. Conduit 33 is connected to the portion 23 of inlet 22 and provides the necessary volume of liquid to the annular space 24 so that liquid will be discharged from the open end. It is a well known hydraulic principle that with a liquid under a given pressure, the liquid possesses a certain potential energy so that if the discharge orifice size is reduced, the discharge stream length will be greater. Accordingly an annulus 30 is provided around the tube 28 and may either be secured thereto in suitable fashion as by sweating or welding or may be cast integral therewith.

In Figure 4, I have shown a slightly modified construction generally designated 17' in which the bore of casing 18 is counter-bored as at 31 to receive therein an annulus 30' which likewise restricts the discharge opening of member 17' in a way similar to that previously described. Casing 18' has a screw threaded end to adjustably receive a flange nut 32 which has openings 26' for receiving fastening means for attaching to the hull of the boat and is provided with spacer projections 27' to maintain the exhaust conduit 12' in spaced relation therewith. As in the previous embodiment the casing 17' may be welded to the conduit 12'.

Thus I have described a fitting which is successful in eliminating objectionable exhaust odors by enveloping the gases as they pass thereout for a considerable distance aft. Effectively the gases are "laid" on the sea with a layer of water thereover for a sufficient length of time so that a following breeze will not blow them back into the vessel's cockpit. Additionally, there is some absorption action occurring between the gases and the water which further enhances the operation of the device. It will, of course, be understood that certain modifications from the illustrated connections may be made, as for instance the supply of water to the fitting input 22, for some installations will be capable of using engine block cooling water directly, provided sufficient pressure is available.

I claim:

1. An exhaust thru-hull fitting for a marine engine adapted for connection to the exhaust line of said engine and located to discharge the exhaust fumes above the water line of the hull comprising a tube, a tubular member spaced from and surrounding said tube at the discharge end portion thereof and sealed to the wall of said tube inwardly of the discharge end of the tube to form a tubular passageway open at the other end thereof, said member having an inlet for a flow of water through said member into said passageway, said tube extending substantially flush with the open end of said member, whereby the flow of water under pressure through said passageway will discharge therefrom in a generally tubular form so as to envelop the exhaust gases as discharged from said tube.

2. An exhaust thru-hull fitting for a marine engine adapted for connection to the exhaust line of said engine and located in a position through the hull to discharge above the water line thereof comprising a tube, a tubular member spaced from and surrounding said tube at the discharge end portion thereof, said member forming a joint with the wall of said tube inwardly of the discharge end of the tube to form a tubular passageway closed at the said joint and open at the other end thereof, said member having an inlet for a flow of water through said member into said passageway, said tube extending substantially flush with the open end of said member, and means restricting the space between said tube and said member at the said discharge end of said passageway to form a circular nozzle.

3. In a motor boat, the combination of an internal combustion engine having an exhaust for the spent gases, a conduit for said spent gases extending to discharge the exhaust gases above the water line of the boat, and a tubular member spaced from and surrounding said conduit at the discharge end thereof, said member being provided with an end wall extending in seal-tight engagement with the walls of said conduit and open at the other end thereof, means connecting said member to a water supply under pressure for a flow of water through said member in the space between the inner wall thereof and the outer wall of said tube, the discharge end of said tube extending substantially flush with the open end of said member and means restricting the space between said member and said tube at the discharge end thereof to form a circular nozzle.

References Cited in the file of this patent

UNITED STATES PATENTS

| | | |
|---|---|---|
| 2,204,294 | Blanchard | June 11, 1940 |
| 2,766,714 | Hammers | Oct. 16, 1956 |

FOREIGN PATENTS

| | | |
|---|---|---|
| 480,443 | France | May 9, 1916 |